(12) United States Patent
Teixeira

(10) Patent No.: US 6,754,329 B2
(45) Date of Patent: *Jun. 22, 2004

(54) SYSTEM AND METHOD FOR SWITCHING TELECOMMUNICATIONS SERVICE IN A MULTIPLE DWELLING UNIT/MULTIPLE TENANT UNIT ENVIRONMENT

(75) Inventor: Joe Teixeira, Mount Royal (CA)

(73) Assignee: NHC Communications (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/060,196

(22) Filed: Feb. 1, 2002

(65) Prior Publication Data

US 2002/0101973 A1 Aug. 1, 2002

Related U.S. Application Data

(63) Continuation-in-part of application No. 09/772,954, filed on Jan. 31, 2001.

(51) Int. Cl.$^7$ ................................................ H04M 7/00
(52) U.S. Cl. .................. 379/221.02; 379/327; 379/291; 379/292; 379/221.01
(58) Field of Search ........................ 379/221.01, 114.06

(56) References Cited

U.S. PATENT DOCUMENTS 5,809,120 A * 9/1998 Montgomery et al. . 379/114.06
6,301,351 B1 * 10/2001 King ..................... 379/221.01

OTHER PUBLICATIONS

The Irwin handbook of telecommunications, Fourth edition, copyright 2000, 1997, 1992, 1989 by Patel, Inc. (pp. 200–201).*

* cited by examiner

Primary Examiner—Ahmad F. Matar
Assistant Examiner—Karen Le
(74) Attorney, Agent, or Firm—Swidler Berlin Shereff Friedman, LLP

(57) ABSTRACT

A system and method for managing, switching, and reconfiguring physical connections of telecommunications services that provides improved cost and timeliness. The method comprises the steps of: providing telecommunications service for telecommunications equipment of a first subscriber via a cross-connect switch connected to a telecommunications network, the telecommunications equipment of the first subscriber connected to a first telecommunications service, the cross-connect switch implemented between a central office and a subscriber location; receiving, at a network operations center connected to the cross connect switch, an indication that the first subscriber has terminated or changed service; in response to receiving, at the network operations center, an indication that the first subscriber has changed service, transmitting a command to the cross connect switch to switch the connection of the telecommunications equipment of first subscriber from the first service to a second service; and in response to receiving the command at the cross-connect switch, switching the connection of the telecommunications equipment of first subscriber from the first telecommunications service to a second telecommunications service.

45 Claims, 16 Drawing Sheets

SYSTEM AND METHOD FOR SWITCHING TELECOMMUNICATIONS SERVICE IN A MULTIPLE DWELLING UNIT/MULTIPLE TENANT UNIT ENVIRONMENT

CROSS-REFERENCE TO RELATED APPLICATIONS

This application is a continuation-in-part of U.S. application Ser. No. 09/772,954, filed Jan. 31, 2001.

FIELD OF THE INVENTION

The present invention relates to a system and method for switching digital subscriber line service in which new connections are switched in and obsolete connections are switched out.

BACKGROUND OF THE INVENTION

High-speed data services are increasingly being deployed into the multiple-dwelling/multiple-tenant unit (MDU/MTU) environment. As a result, property managers are encountering new challenges. Since the deregulation of the telecom industry, the number of service providers and service options has grown exponentially. From the provisioning perspective, techniques are needed to allow the wide array of options to be connected to tenant premises. There are problems with pre-wiring tenant premises for fixed services due to the rate of subscriber churn and given that tenants prefer not to be locked in to one service or service provider. For example, to remain competitive, some property owners may provide access to multiple Internet Service Providers (ISP).

One of the key problems with provisioning high-speed data services to large rental properties is how to manage the numerous telecom and data services that tenants need. For example, such services may include Plain Old Telephone System (POTS), T1, Asynchronous Digital Subscriber Line (ADSL) and Synchronous Digital Subscriber Line (SDSL). Typically, these services originate from more than one service provider, such as the incumbent local exchange carrier (ILEC), competitive local exchange carriers (CLEC) or ISPs. A problem arises in managing the physical copper wiring connections between a myriad of data/voice services and the tenants' premises. The problem is compounded by the fact that tenants move, terminate service, or migrate to newer services or providers.

The physical management problem described above is shown in FIG. 1. As shown in FIG. 1, a plurality of tenant telecommunication units, such as computer systems 102 and 104 and telephone stations 106 and 108, are connected to the appropriate telecommunication network equipment via Main Distribution Frame (MDF) 110. For example, computer systems 102 and 104 may be connected using a Digital Subscriber Line (DSL) protocol, while telephone stations 106 and 108 may be connected as standard analog telephones. Computer system 102 may be connected using Symmetrical DSL (SDSL), which is a capable of supporting voice and data over IP via a 2-wire line. SDSL is attractive because of its relatively low installation cost and its ability to handle multiple voice channels along with data over 2-wire lines. Computer system 104 may be connected using Asymmetrical DSL (ADSL), which requires a POTS splitter 112 in order to support both data and analog voice over the same 2-wire line. MDF 110 connects the incoming lines from the tenant telecommunications system to the appropriate service provider equipment, which typically are multi-service access platforms (MSAP) that can support a plurality of telecommunications services. In the example shown in FIG. 1, a CLEC operating MSAP 114 connects computer system 102 to a digital service, an ILEC operating MSAP 116 connects telephone station 106 to a POTS service and an ISP operating MSAP 118 connects computer system 104 to a digital service and telephone station 108 to a POTS service.

If a tenant moves, terminates service, or migrates to newer services or providers, the physical wiring in MDG 110 must be reconnected to accommodate the changes. This physical reconnection is expensive and often cannot be performed in a timely fashion. While a property manager can limit the choices offered to the tenant, market pressures dictate that a wider range of choices be offered to tenants. The cost and time to manage these physical connections becomes a significant factor. A need arises for a technique by which the physical connections may be managed and reconfigured that provides improved cost and timeliness.

SUMMARY OF THE INVENTION

The present invention is a system and method for managing, switching, and reconfiguring physical connections of telecommunications services that provides improved cost and timeliness. A method, according to the present invention, comprises the steps of: providing telecommunications service for telecommunications equipment of a first subscriber via a cross-connect switch connected to a telecommunications network, the telecommunications equipment of the first subscriber connected to a first telecommunications service; receiving, at a network operations center connected to the cross connect switch, an indication that the first subscriber has terminated or changed service, the cross-connect switch implemented between a central office and a subscriber location; in response to receiving, at the network operations center, an indication that the first subscriber has changed service, transmitting a command to the cross connect switch to switch the connection of the telecommunications equipment of first subscriber from the first service to a second service; and in response to receiving the command at the cross-connect switch, switching the connection of the telecommunications equipment of first subscriber from the first telecommunications service to a second telecommunications service.

The cross-connect switch may be implemented as a pole mounted facility or as a curb-side facility. The method may further comprise the step of replacing a patch panel with the cross-connect switch. The step of replacing the patch panel with the cross-connect switch may comprise the step of pre-connecting the cross-connect switch initially to match connections within the patch panel. The step of pre-connecting the cross-connect switch initially to match connections within the patch panel may comprise the steps of accessing a service database at the central office to obtain a configuration of the patch panel for replacement, and commanding the cross-connect switch to reproduce the connections of the patch panel as defined in the service database. The step of replacing the patch panel with the cross-connect switch may further comprises the steps of wiring the cross-connect switch in parallel with the patch panel, verifying the connections using test routines, and disconnecting the patch panel.

The method may further comprise the steps of: in response to receiving, at the network operations center, an indication that the first subscriber has terminated service, transmitting a command to the cross connect switch to switch out the connection of the telecommunications equipment of first subscriber from the first service; and in response to receiving the command at the cross-connect switch, switching out the connection of the telecommunications equipment of first subscriber from the first service.

The method may further comprise the steps of: receiving, at the network operations center, an indication that a second subscriber has initiated service; in response to receiving the indication at the network operations center, transmitting a command to the cross connect switch to connect data processing equipment of the second subscriber to a telecommunication service; and in response to receiving the command at the cross-connect switch, connecting the data processing equipment of second subscriber to the telecommunication service.

The telecommunications equipment of the first subscriber may be located in a multiple dwelling unit or multiple tenant unit. The cross connect switch may be connected to a plurality of telecommunications equipment located in the multiple dwelling unit or multiple tenant unit.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is a system that provides the capability to manage and reconfigure physical connections with improved cost and timeliness. The present invention provides the flexibility of being able to perform moves, adds, and changes on-demand and on the fly, without field technical service. The physical connections between services and tenants' lines may be remotely controlled by a facilities manager or servicing contractor. The services from the various access platforms and service providers are terminated on the equipment-side of the cross-connect switch. The subscriber-side of the exemplary ControlPoint cross-connect system is connected to the tenant premises. The entire system is controlled via a Windows-based graphical user interface (GUI) either on the landlord's premises or from a third party servicing contractor. Whenever a tenant requests connection to a service, the NMS establishes a physical connection between the appropriate multi-service access platform and the tenant's wire pair.

Figure 1:
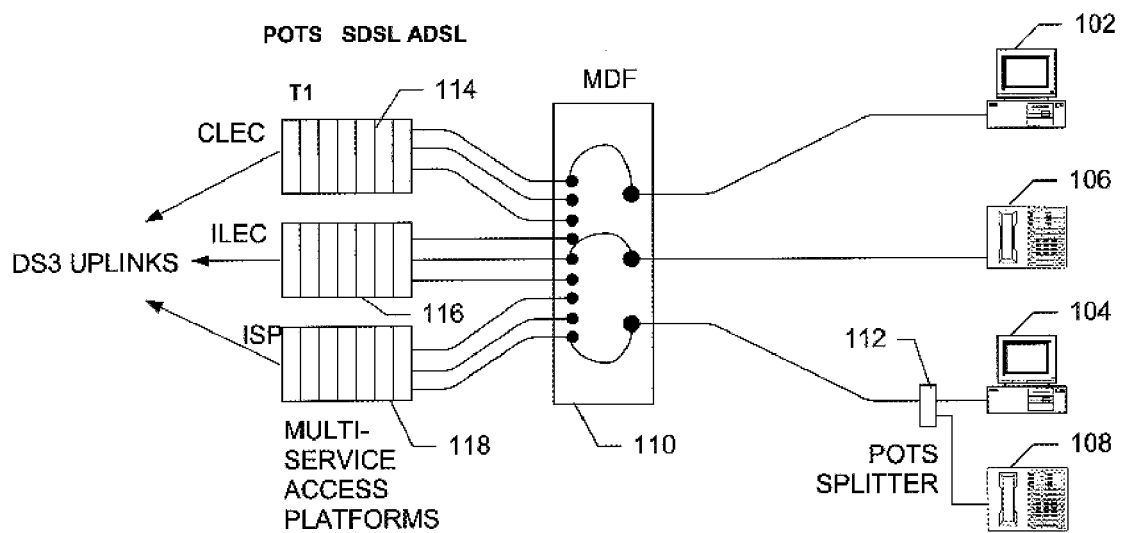
FIG. 1 is a block diagram of a prior art telecommunications system illustrating the physical management problem.
Figure 2:
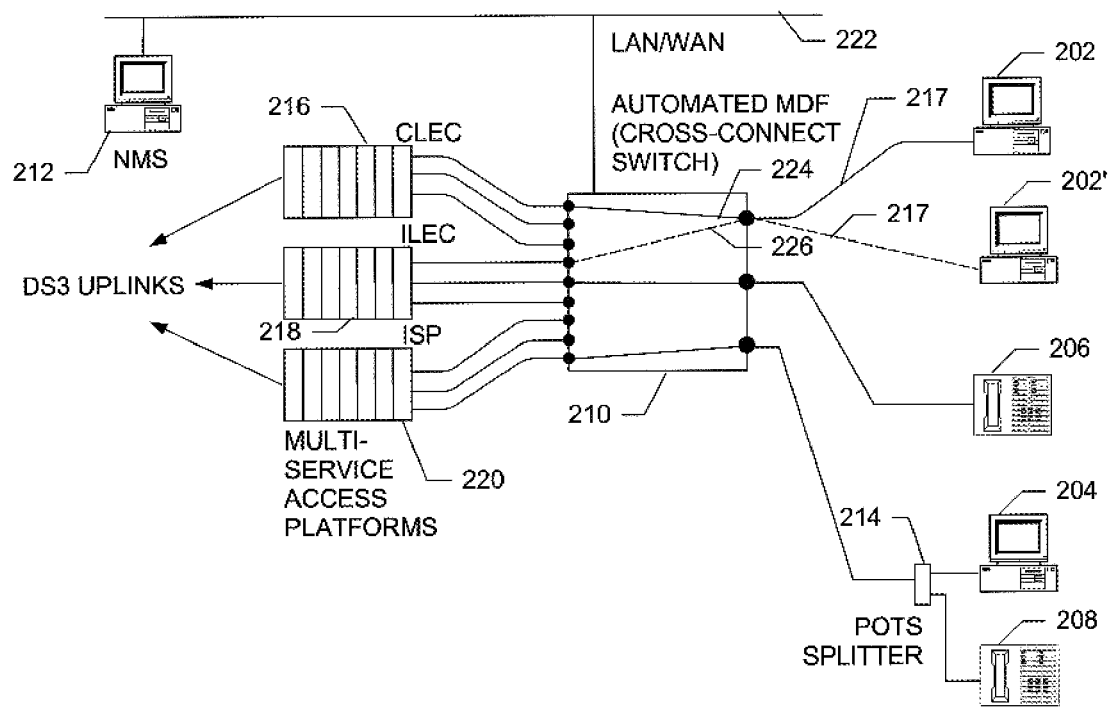
FIG. 2 is an exemplary block diagram of telecommunications system incorporating the present invention.

A typical system incorporating the present invention is shown in FIG. 2. A plurality of tenant telecommunication units, such as computer systems 202 and 204 and telephone stations 206 and 208, are connected to the appropriate telecommunication network equipment via an automated MDF 210. Automated MDF 210 includes an automated, remotely controllable cross-connect switch, which is controlled by network operations center (NMS) 212. In the example shown in FIG. 2, computer systems 202 and 204 may be connected using a Digital Subscriber Line (DSL) protocol, while telephone stations 206 and 208 may be connected as standard analog telephones.

Digital Subscriber Line (DSL) is one of the signal protocols being used to carry broadband digital data over existing two-wire telephone lines. There are several versions of DSL in common use. Asymmetric DSL (ADSL) provides greater bandwidth for downstream data than for upstream data. In addition, ADSL reserves a portion of the available channel bandwidth for support of traditional analog telephone service (Plain Old Telephone Service (POTS)). ADSL is aimed primarily at the residential market. Another version of DSL is Symmetric DSL (SDSL). SDSL provides equal bandwidth in both the upstream and downstream directions and does not provide support for POTS. SDSL is better suited to business applications, such as network server communications, etc. SDSL is attractive because of its relatively low installation cost and its ability to handle multiple voice channels along with data over 2-wire lines.

Computer system 202 may be connected using Symmetrical DSL (SDSL), which is a capable of supporting voice and data over IP via a 2-wire line. Computer system 204 may be connected using Asymmetrical DSL (ADSL), which requires a POTS splitter 214 in order to support both data and analog voice over the same 2-wire line. The automated MDF 210 connects the incoming lines from the tenant telecommunications system to the appropriate service provider equipment, which typically are multi-service access platforms (MSAP) that can support a plurality of telecommunications services. In the example shown in FIG. 2, a CLEC operating MSAP 216 connects computer system 202 to a digital service, an ILEC operating MSAP 218 connects telephone station 206 to a POTS service and an ISP operating MSAP 220 connects computer system 204 to a digital service and telephone station 208 to a POTS service.

Network management system (NMS) 212 is connected to cross-connect switch 210 via a network 222, which can be any standard or proprietary network, such as a local area network (LAN) or a wide area network (WAN), or may even be a serial dial-up network. NMS 212 can control the configuration and operation of cross-connect switch 210 over network 222. Likewise, NMS 212 can determine the status and configuration of cross-connect switch 210 over network 222.

An example of a suitable cross-connect switch 210, is the CONTROLPOINT™ switch available from NHC. As used herein, the terms cross-connect and cross-connect switch are intended to mean any switch capable of reliably interconnecting telecommunications signals, including voice and data signals, from inputs to outputs under the influence of internal or external control signals. The terms are intended to encompass any such switch and control systems, including loop management systems. To illustrate the operation of an embodiment of a cross-connect switch 210 and the manner in which it is controlled, the CONTROLPOINT switch available from NHC is hereafter briefly described.

The CONTROLPOINT solution is NHC's integrated non-blocking copper cross-connect system that helps CLECs and ILECs qualify and provision DSL and other services remotely without the need to enter the CLEC's COLLO or ILEC's CO. The CONTROLPOINT solution works with third party equipment such as Harris, Hekimian and Toll-grade Remote Test Units, enabling the cross-connect to be used as a test access platform for rapid loop qualification. The CONTROLPOINT solution may be deployed for DSL test access for local loop qualification, provisioning, migration and fallback switching. The CONTROLPOINT solution is intended to work with every major DSLAM vendor.

The CONTROLPOINT cross-connect hardware has a matrix size and loopback capabilities that allow multiple services to be provisioned and migrated remotely on-the-fly and on-demand, thereby minimizing truck-rolls needed to qualify and provision high speed data services. The CONTROLPOINT solution allows the service provider to migrate users to higher speed data services quickly. The CLEC has the ability to use any available port on the DSLAM for fallback switching thus providing added value to both the CLEC and the subscriber.

The CONTROLPOINT solution is managed via two-key elements: CONTROLPOINT CMS 212 and CONTROLPOINT CMS Remote (Controller) (not shown). CONTROLPOINT CMS 212 is the control and management software for NHC's CONTROLPOINT Solution. Element 212 is later referred to generically as network management system (NMS) and may also be referred to as a terminal. CONTROLPOINT CMS 212 communicate with NHC's CONTROLPOINT Copper Cross-Connect 210 via the CONTROLPOINT CMS Remote Controller to allow voice and high-speed data service providers to take fall control of their copper cross-connect infrastructure.

CONTROLPOINT CMS controls and tracks the physical connections within the CONTROLPOINT matrix, along with vital subscriber and equipment information. CONTROLPOINT CMS features an intuitive Graphical User Interface (GUI) for greater ease of use. Port connections involve a simple drag & drop operation. CONTROLPOINT CMS's integrated database tracks CONTROLPOINT subscriber/service connections and organizes the network into multi-level geographical views by country, city and site location.

CONTROLPOINT CMS Remote is the SNMP control interface for NHC's CONTROLPOINT copper cross-connect switch, which allow the CONTROLPOINT cross-connect 210 to be managed via NHC's CONTROLPOINT Control and Management Software (CMS) or managed via third party Network Management System (NMS). The CONTROLPOINT CMS Remote is connected to an Ethernet LAN and is accessible via standard SNMP commands. The CONTROLPOINT CMS Remote connects to CONTROLPOINT cross-connect via serial link. The device receives standard SNMP commands from the NMS or CONTROLPOINT CMS and communicates them to the CONTROLPOINT cross-connect. Support for API (application interfaces) within the CONTROLPOINT CMS Remote and CONTROLPOINT CMS allows for customization to support NHC's proposed line-sharing solution.

While the CONTROLPOINT switching system may be used to implement the cross-connect switch, it will be understood that any remotely controllable cross-connect switching system may be implemented according to embodiments of the present invention. The cross-connect switch 210 and its controllers are hereafter referred to generically. Also, the terms cross-connect switch and cross-connect are used interchangeably.

Figure 3:
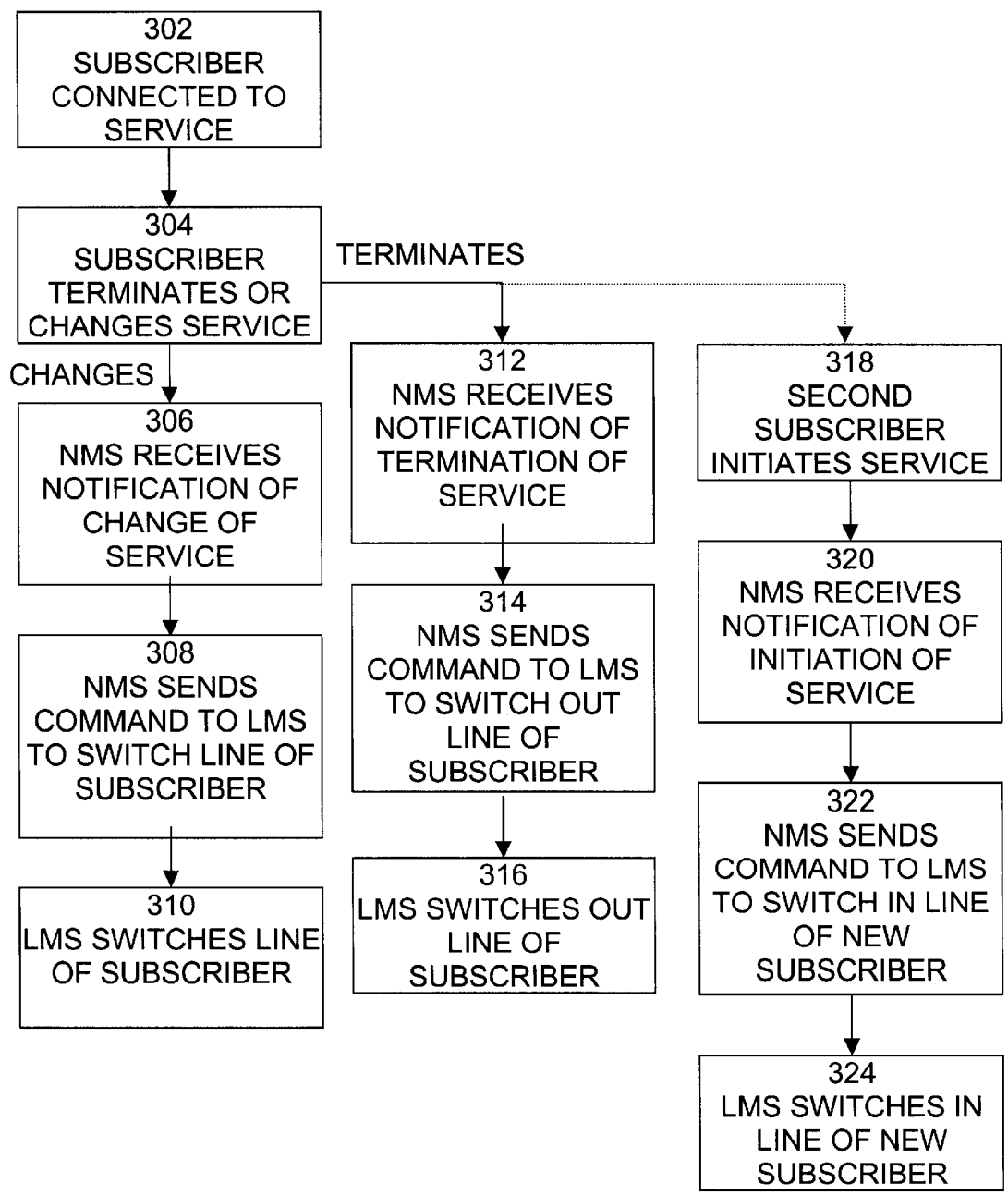
FIG. 3 is an exemplary flow diagram of a process of operation of the present invention, implemented in the system shown in FIG. 2.

A process of operation of the present invention, implemented in the system shown in FIG. 2, is shown in FIG. 3. It is best viewed in conjunction with FIG. 2. The process begins with step 302, in which, initially, a subscriber operating telecommunications equipment, such as computer system 202 is connected to service, such as the service provided by MSAP 216, via a connection 224 provided by cross-connect switch 210. System 202 is connected to cross-connect switch 210 by line 217. In step 304, the subscriber operating system 202 terminates all service or changes service so as to terminate service with the operator of MSAP 216, making connection 224 obsolete. If, in step 304, the subscriber changed service, then the process continues with step 306, in which network operations center 212 receives notification of the change of service for system 202. In step 308, in response to receiving notification of the change of service for system 202, network operations center 212 transmits a command to cross-connect switch 210 to switch the line of system 202 from the terminated service provided by MSAP 216 to the new service. In step 310, in response to the command received from network operations center 212, cross-connect switch 222 switches the line of system 202 from the terminated service provided by MSAP 216 to the new service. In order to implement the switch out, cross connect switch 210 disconnects or deletes the original connection and establishes a new connection. For example, NMS 212 may command cross-connect switch 210 to delete connection 224, which connected system 202 to MSAP 216 and to establish connection 226, which will connect system 202 to MSAP 218.

If, in step 304, the subscriber terminated service, and there is no new subscriber to replace the original subscriber, then from step 304, the process continues with step 312, in which in which network operations center 212 receives notification of the termination of service for system 202. In step 314, in response to receiving notification of termination of service for system 202, network operations center 212 transmits a command to cross-connect switch 210 to switch out the line of system 202 from the terminated service provided by MSAP 216. In step 316, in response to the command received from network operations center 212, cross-connect switch 222 switches out the line of system 202 from the terminated service provided by MSAP 216, freeing up the line for later use. In order to implement the switch out, cross connect switch 210 disconnects or deletes the original connection. For example, NMS 212 may command cross-connect switch 210 to delete connection 224, which connected system 202 to MSAP 216.

If, in step 304, the subscriber terminated service and there is a new subscriber to replace the original subscriber, then from step 304, the process continues with step 318, in which a second subscriber operating telecommunications equipment, such as computer system 202', initiates service, such as the service provided by the operator of MSAP 218. In the example shown in FIG. 2, system 202' takes the place of system 202, and thus is connected to cross-connect switch 210 by line 217. In step 320, network operations center 212 receives notification of the initiation of service for system 202'. In step 322, in response to receiving notification of the initiation of service for system 202', network operations center 212 transmits a command to cross-connect switch 210 to establish a connection the line of system 202' to the new service. In step 324, in response to the command received from network operations center 212, cross-connect switch 210 establishes a connection the line of system 202' to the new service. For example, NMS 212 may command cross-connect switch 210 to establish connection 226, which will connect system 202' to MSAP 218.

Figure 4:
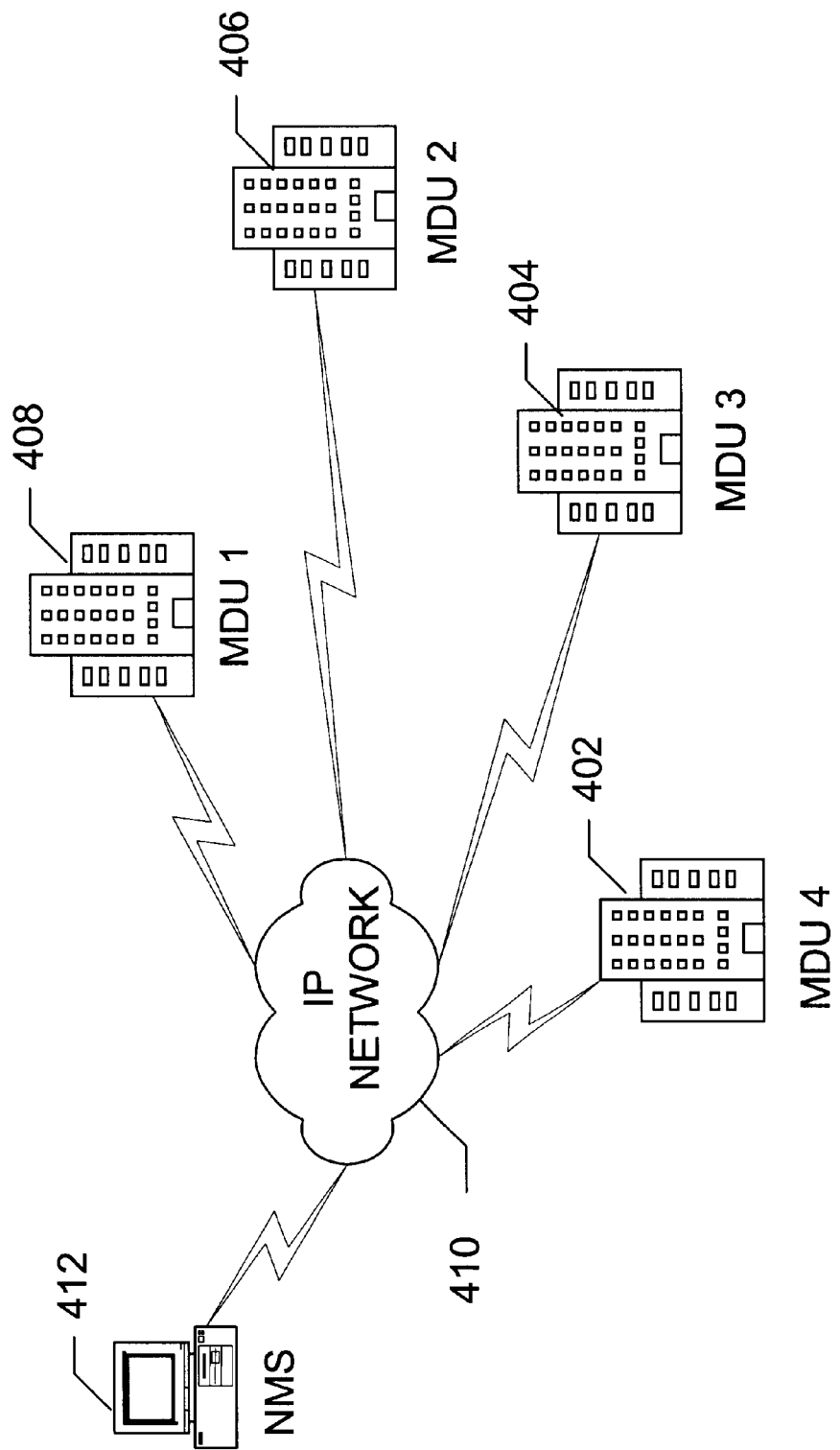
FIG. 4 is an exemplary block diagram of a network of multiple dwelling units incorporating the present invention.

Cross-connect switches becomes even more cost-effective when the Automated MDFs are managed across multiple rental complexes. An example of a case in which multiple rental sites are being managed is shown in FIG. 4. In FIG. 4 a plurality of multiple dwelling units (MDUs), such as MDUs 402, 404, 406 and 408, are connected to IP network 410. The cross-connect switch provides the capability to control the tenant connections from a single network operations center (NMS) 412, eliminating the need to go on-site to make the changes.

Figure 5:
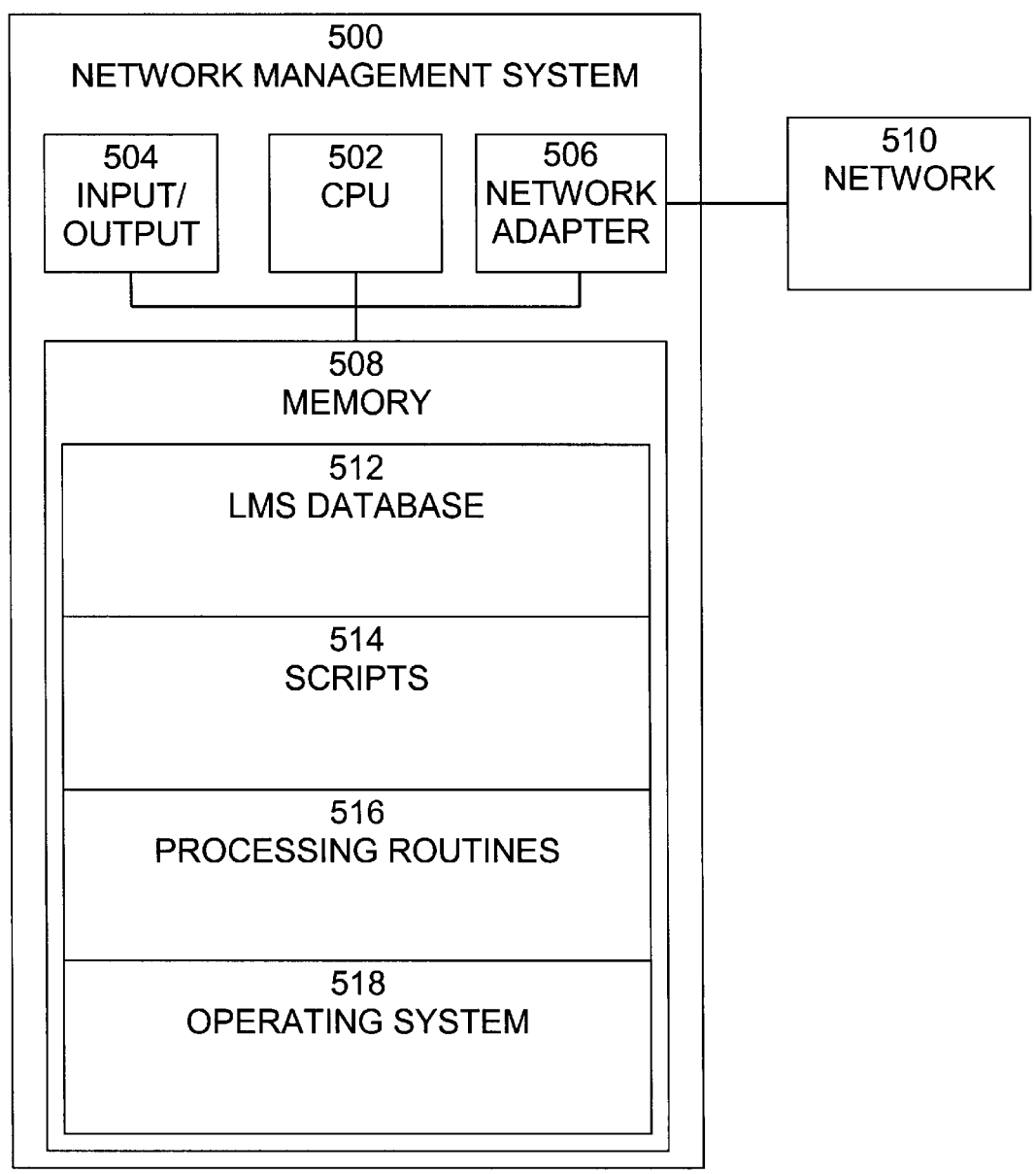
FIG. 5 is an exemplary block diagram of a network operations center's network management system shown in FIG. 2.

An exemplary block diagram of a network operations center 500, according to the present invention, is shown in FIG. 5. Network operations center 500 is typically a programmed general-purpose computer system, such as a personal computer, workstation, server system, and minicomputer or mainframe computer. Network operations center 500 includes processor (CPU) 502, input/output circuitry 504, network adapter 506, and memory 508. CPU 502 executes program instructions in order to carry out the functions of the present invention. Typically, CPU 502 is a microprocessor, such as an INTEL PENTIUM® processor, but may also be a minicomputer or mainframe computer processor. Input/output circuitry 504 provides the capability to input data to, or output data from, computer system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces network operations center 500 with network 510. Network 510 may be any standard local area network (LAN) or wide area network (WAN), such as Ethernet, Token Ring, the Internet, or a private or proprietary LAN/WAN, but typically, IP network 220 is the Internet. Note that a serial dial-up network may also be used instead of an IP based LAN/WAN.

Memory 508 stores program instructions that are executed by, and data that are used and processed by, CPU 502 to perform the functions of the present invention. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 508 includes a plurality of blocks of data, such as Loop Management System (LMS) database 512 and scripts block 514, and a plurality of blocks of program instructions, such as processing routines 516 and operating system 518. LMS database 512 stores information relating to cross-connect switches that are managed and controlled by NMS 500, including information relating to connections maintained by the cross-connect switch. Scripts block 514 includes scripts that are transmitted by NMS 500 to cross-connect switches to control the connection of circuits. Processing routines 516 are software routines that implement the processing performed by the present invention, such as receiving SNMP messages, accessing LMS database 512, transmitting scripts from script block 514, etc. Operating system 518 provides overall system functionality.

Figure 6:
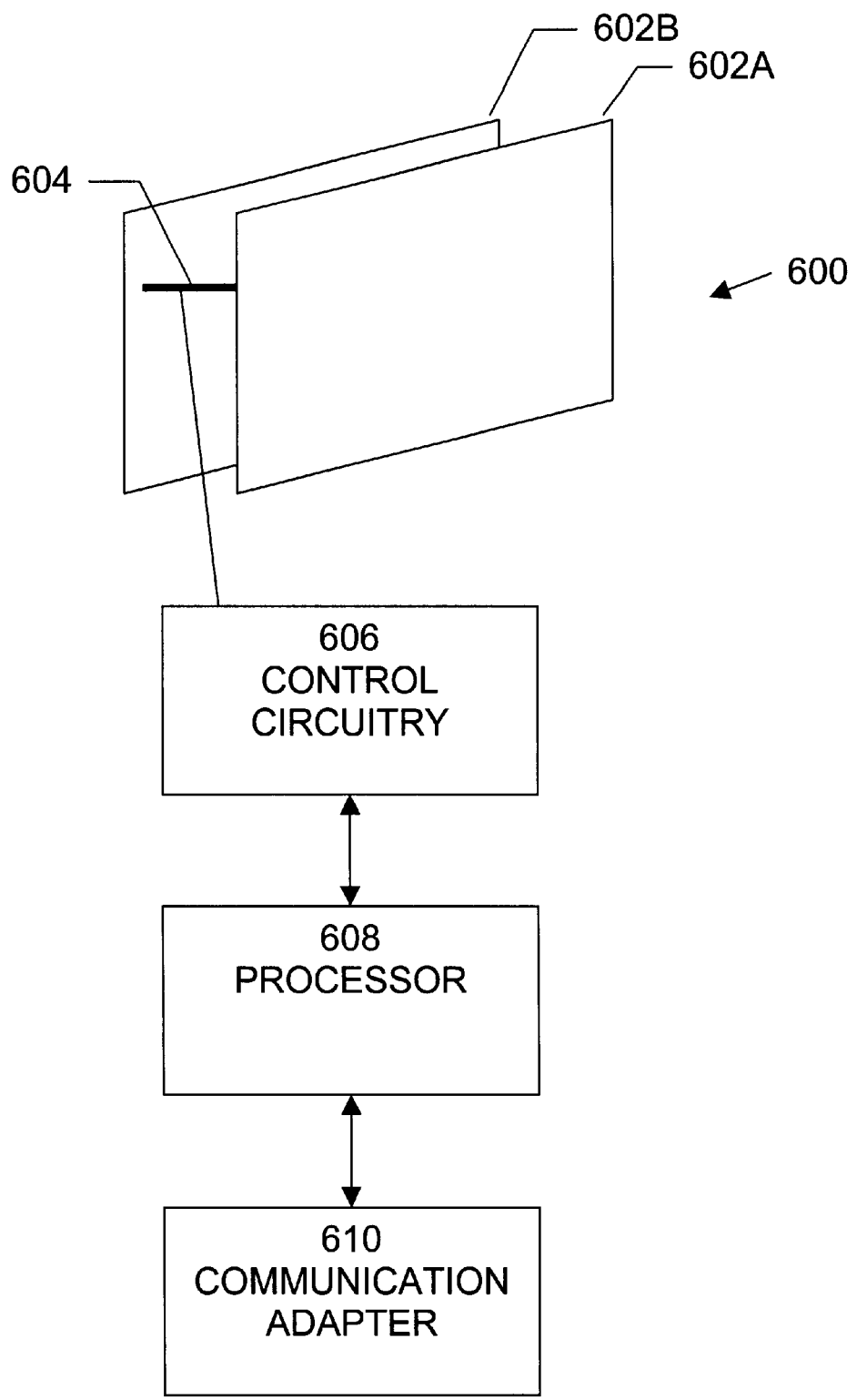
FIG. 6 is an exemplary block diagram of a cross-connect switch shown in FIG. 2.
Figure 7:
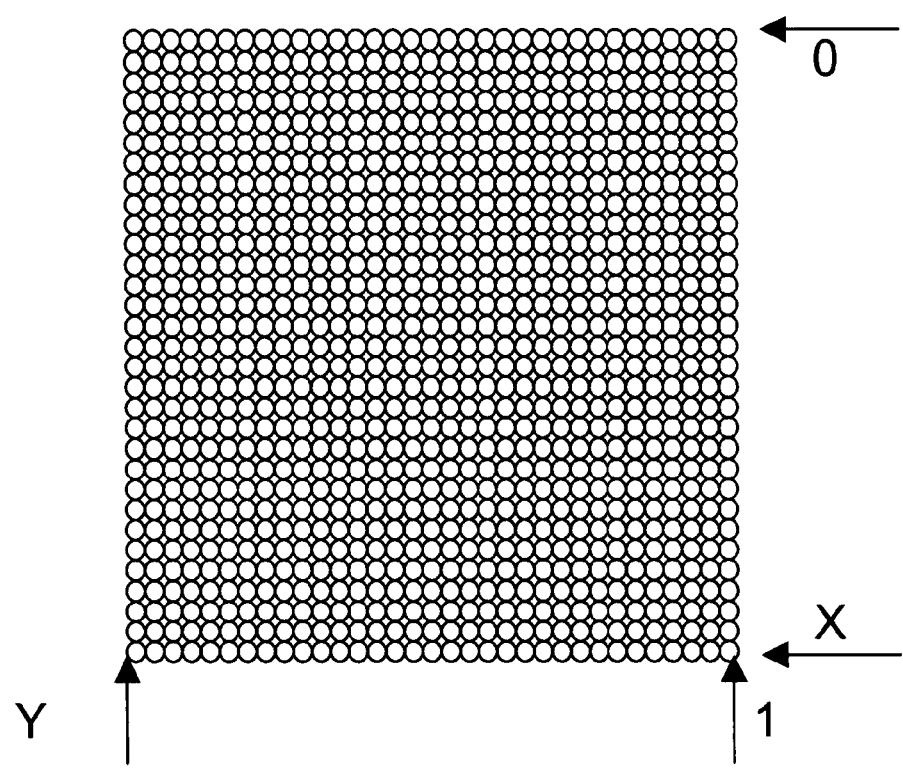
FIG. 7 shows an exemplary matrix board included in the cross-connect switch shown in FIG. 6.
Figure 8:
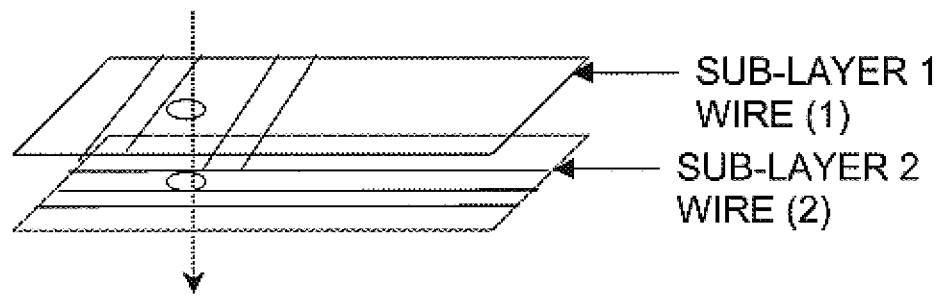
FIG. 8 shows an example of cross point connection in the matrix board shown in FIG. 7.
Figure 9:
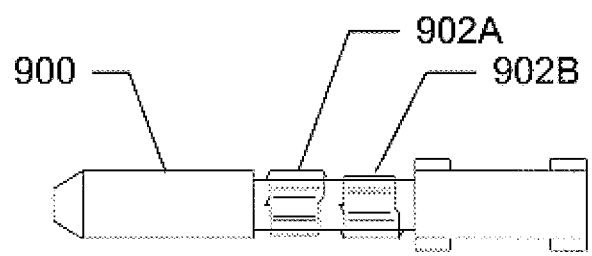
FIG. 9 shows an exemplary cross point connection pin used to establish a cross point connection in the matrix board shown in FIG. 7.

An exemplary block diagram of a ControlPoint Remote cross-connect switch 600 is shown in FIG. 6. Switch 600 includes matrix boards 602A and 602B, robotic cross-connector 604, control circuitry 606, processor 608 and communication adapter 610. Matrix boards 602A and 602B, an example of which is shown in more detail in FIG. 7, are multi-layer matrices of circuits having holes at the intersections of circuits on different layer. The holes, known as cross points, allow the connection of pairs of circuits on different layers by the use of conductive pins. To make a cross connections, a pin is inserted into one of the holes in a matrix board, as shown in FIG. 8. Each pin, such as pin 900, shown in FIG. 9, has two metal contacts 902A and 902B on the shaft, which create the connection between the circuits on different layers of the matrix board.

Figure 10:
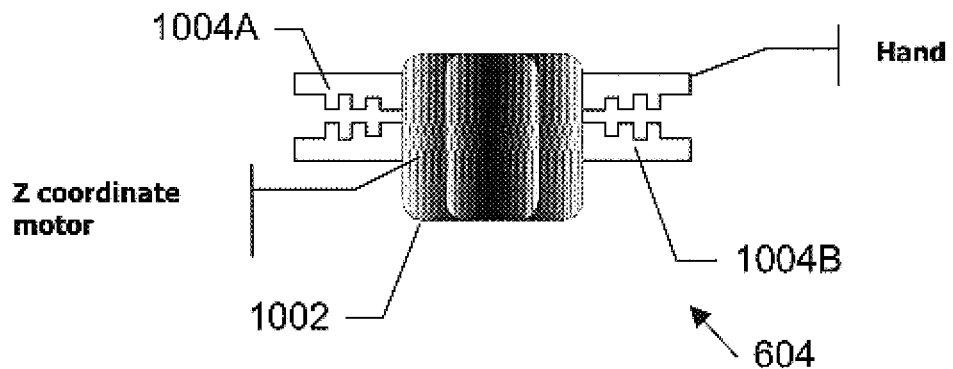
FIG. 10 shows an exemplary robotic cross connector included in the cross-connect switch shown in FIG. 6.

Robotic cross connector 604, an example of which is shown in FIG. 10, provides the capability to move a pin to an appropriate cross point and to insert the pin to form a connection at the cross point or remove the pin to break a cross connection. The mechanism of robotic cross connector 604 is capable of movement in three dimensions, using a separate motor for movement in each dimension. For example, Z-coordinate motor 1002, shown in FIG. 10, provides movement of the mechanism along the Z axis. A pin is carried, inserted and removed by a robotic "hand", such as hand 1004A or 1004B, which is part of robotic cross connector 604.

Control circuitry 606 generates the signals necessary to control operation of robotic cross-connector 604, in response to commands from processor 608. Processor 608 generates the commands that are output to control circuitry 606 in response to commands received from the network operations center via communication adapter 610.

Figure 11:
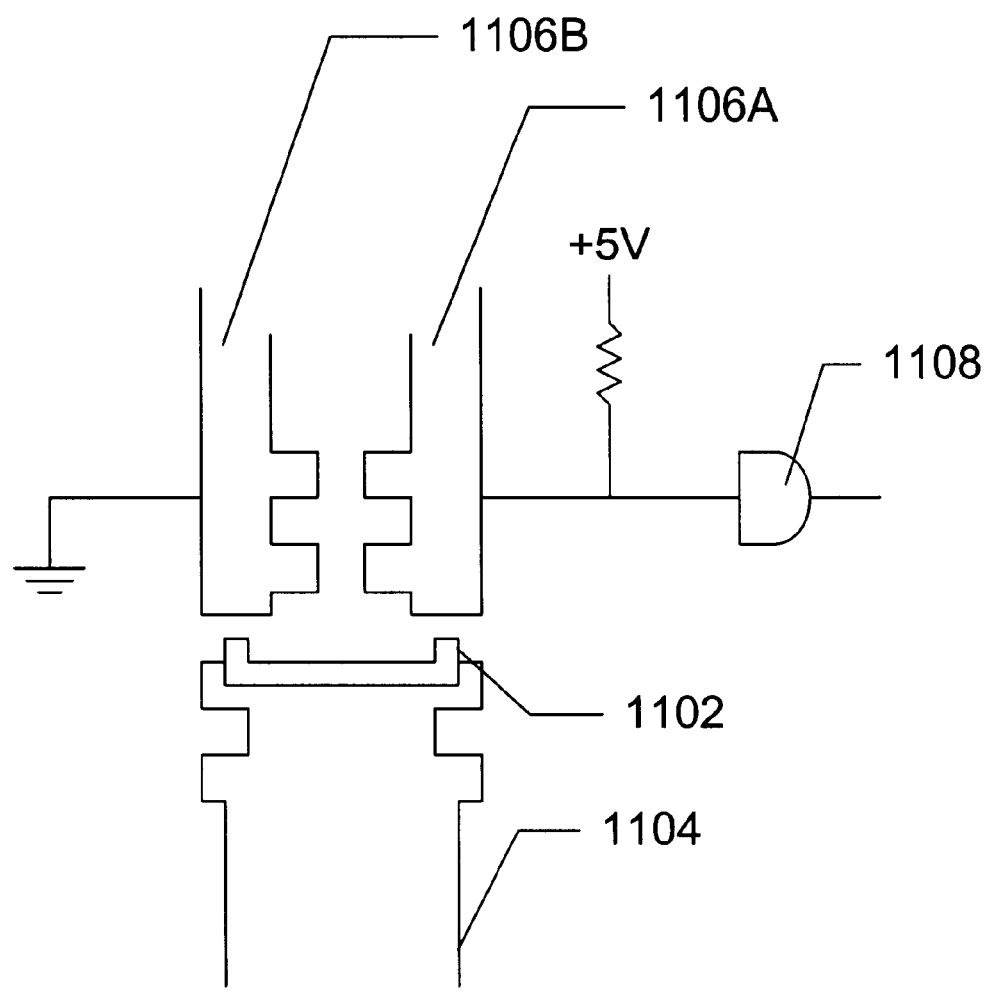
FIG. 11 is an exemplary block diagram of an apparatus that verifies proper connection of a cross point connection pin shown in FIG. 9.

Once the pin has been inserted into the cross-point, robotic cross connector 604 then verifies that the connection has been successfully made, as shown in FIG. 11. In addition to the metal contacts on the shaft of each pin that form the connections, there is also a metal strip 1102 attached to each pin, such as pin 1104. The robot verifies the connection by sending a small current from one hand 1106A to the other hand 1106B. The metallic parts of the robot hand are electrically insulated. Hand 1106B is connected to the ground and hand 1106A is connected to current detector 1108. When the hands touches the metallic strip on the head of connect pin, current flows through the pin and the output of detector 1108 will change states if the insertion is good. If the insertion is not good then the output of detector 1108 will not change.

Figure 12:
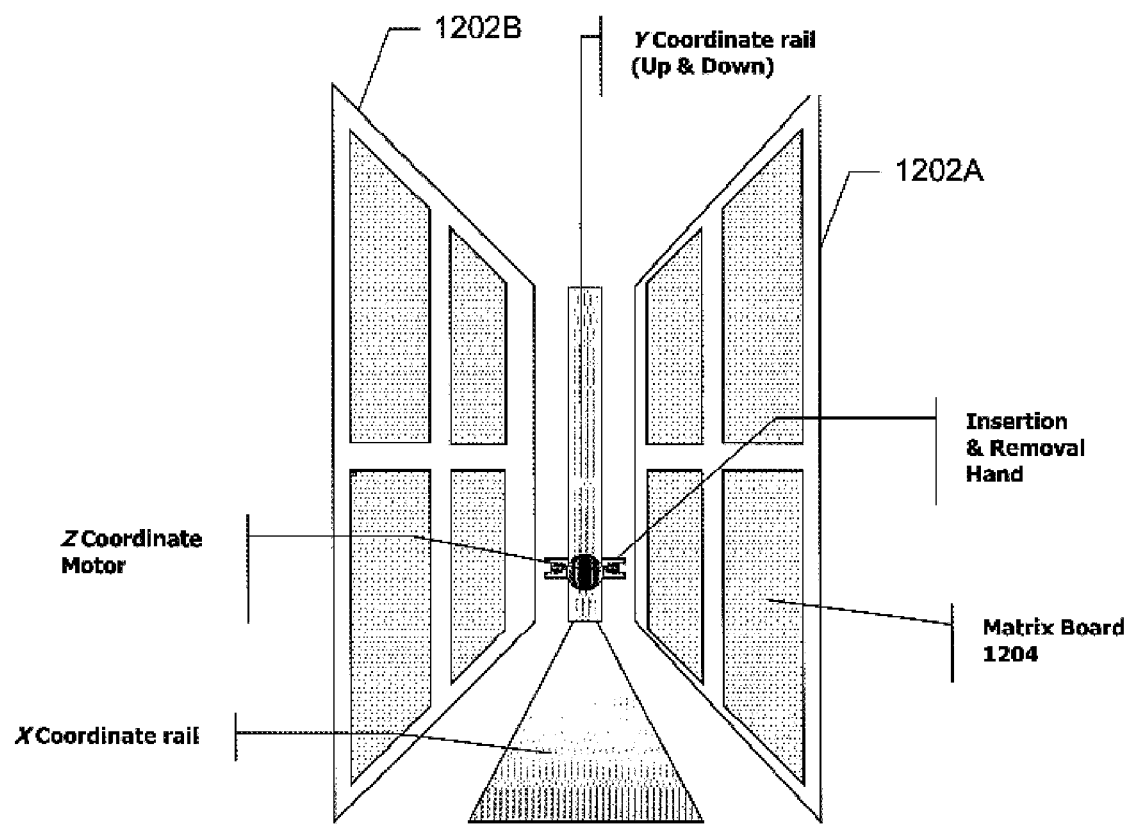
FIG. 12 shows an example of matrix boards in relation to the robotic cross connector.
Figure 13:
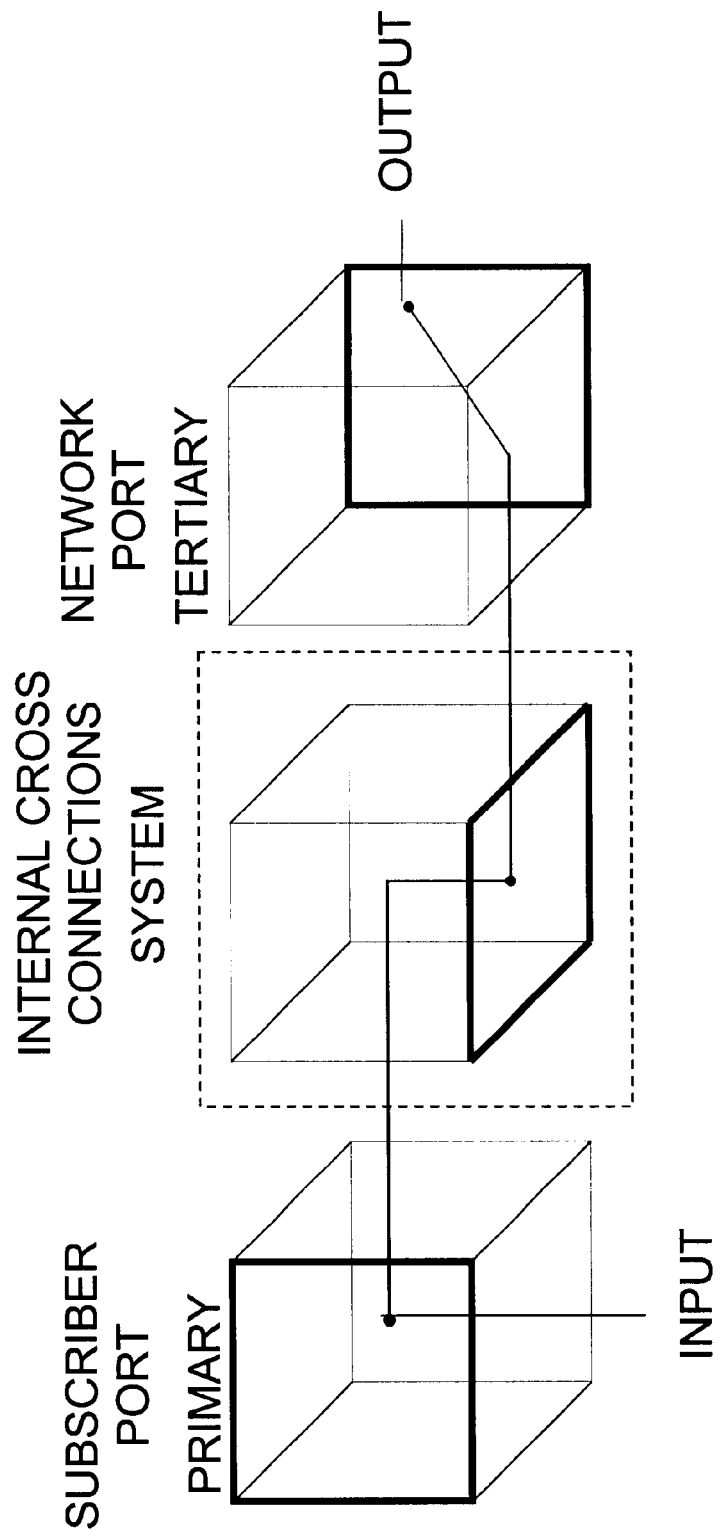
FIGS. 13–18 illustrate some standard 3 dimensional connection paths, which are completed by the cross-connect switch in response to commands.
Figure 14:
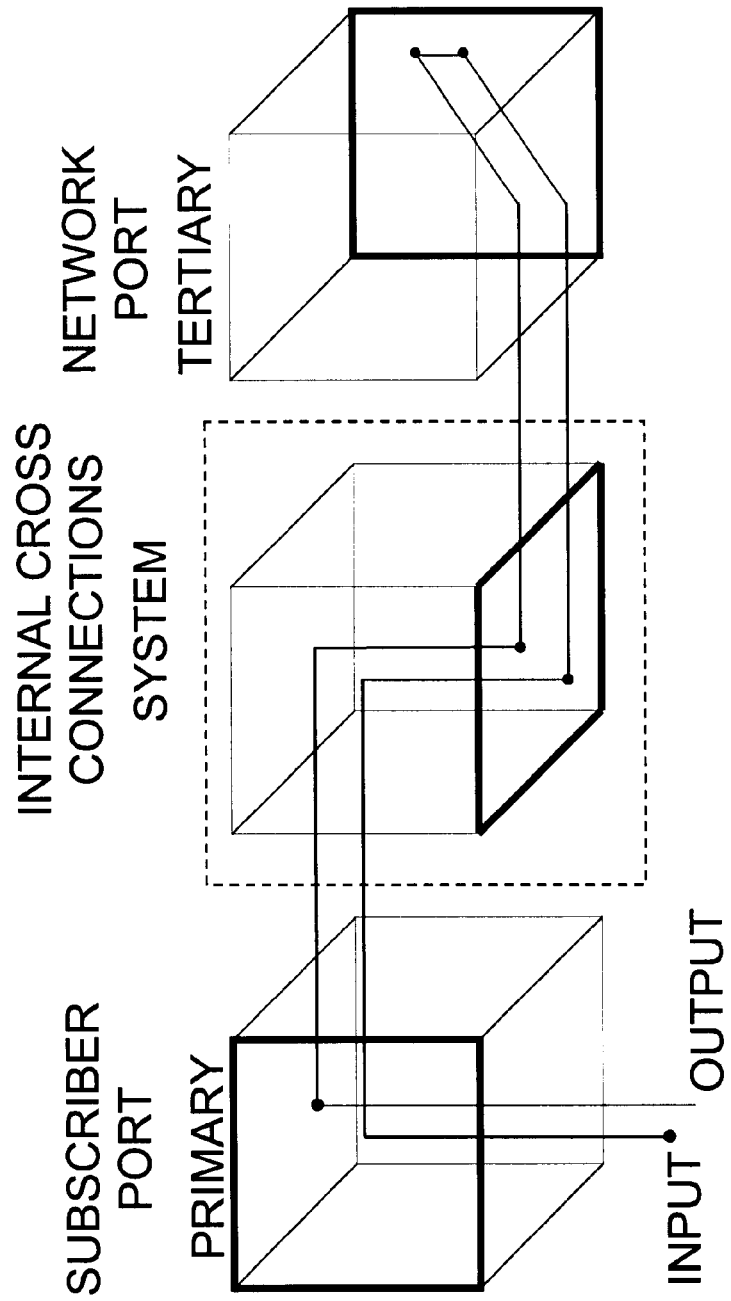
Figure 15:
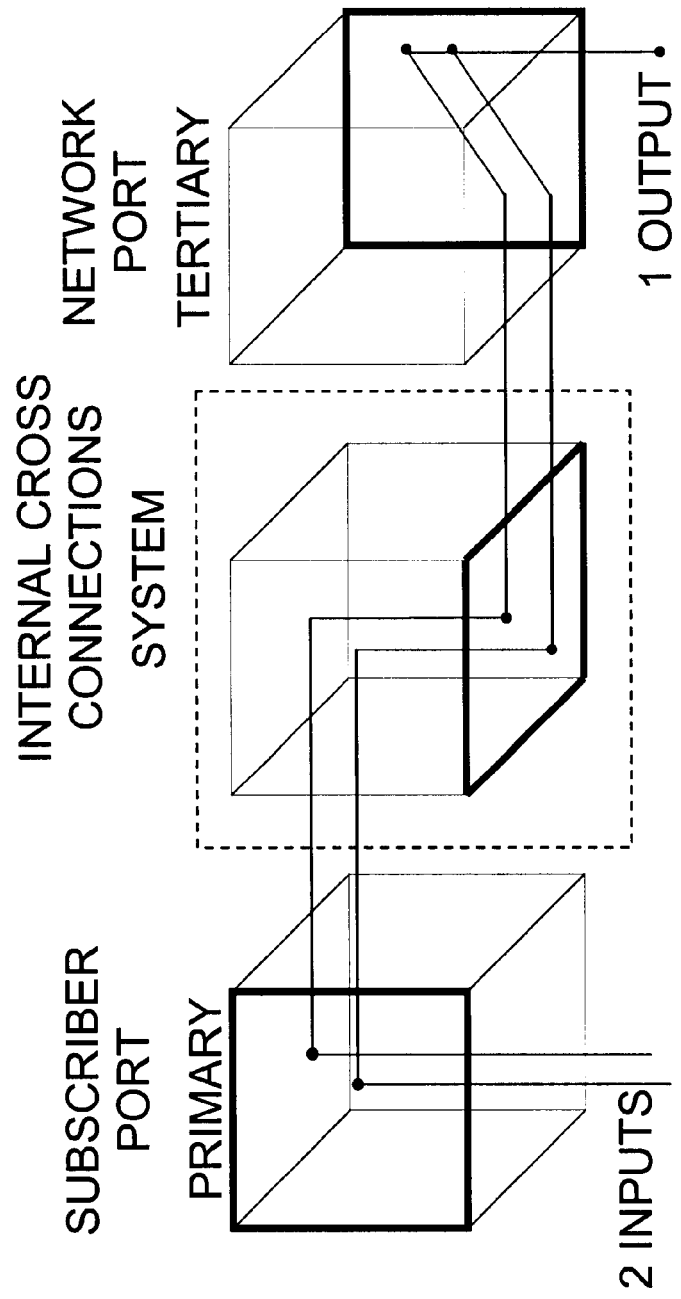
Figure 16:
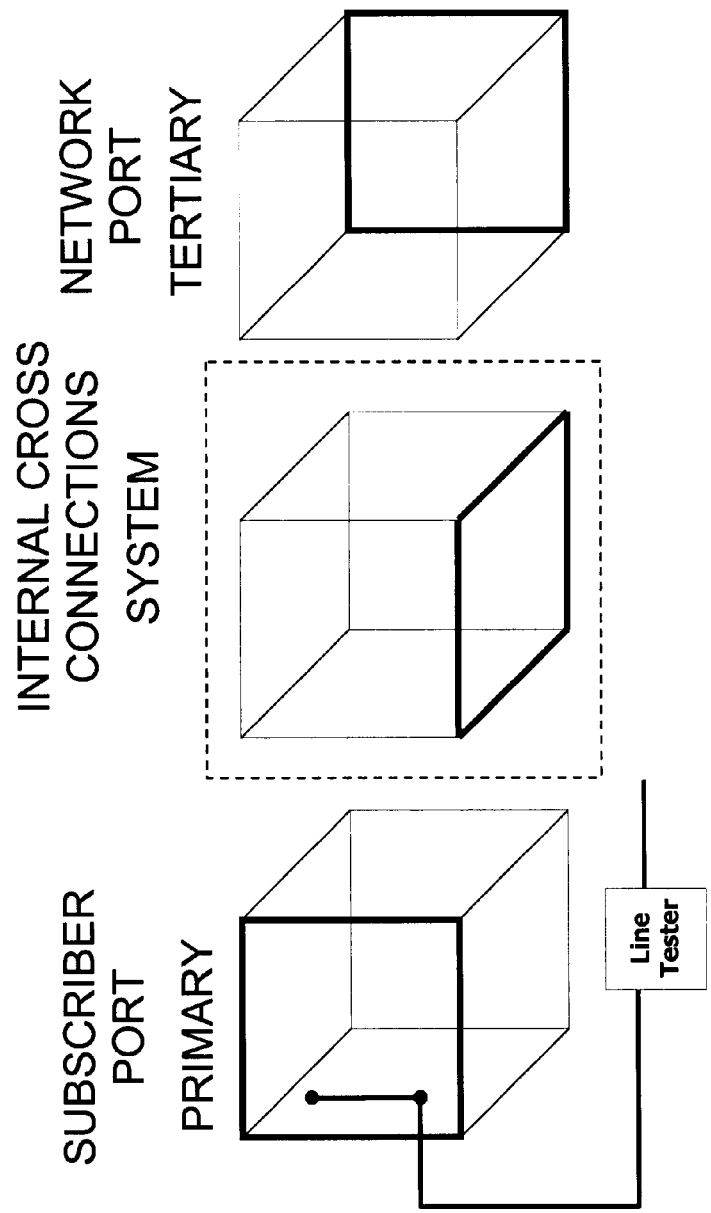
Figure 17:
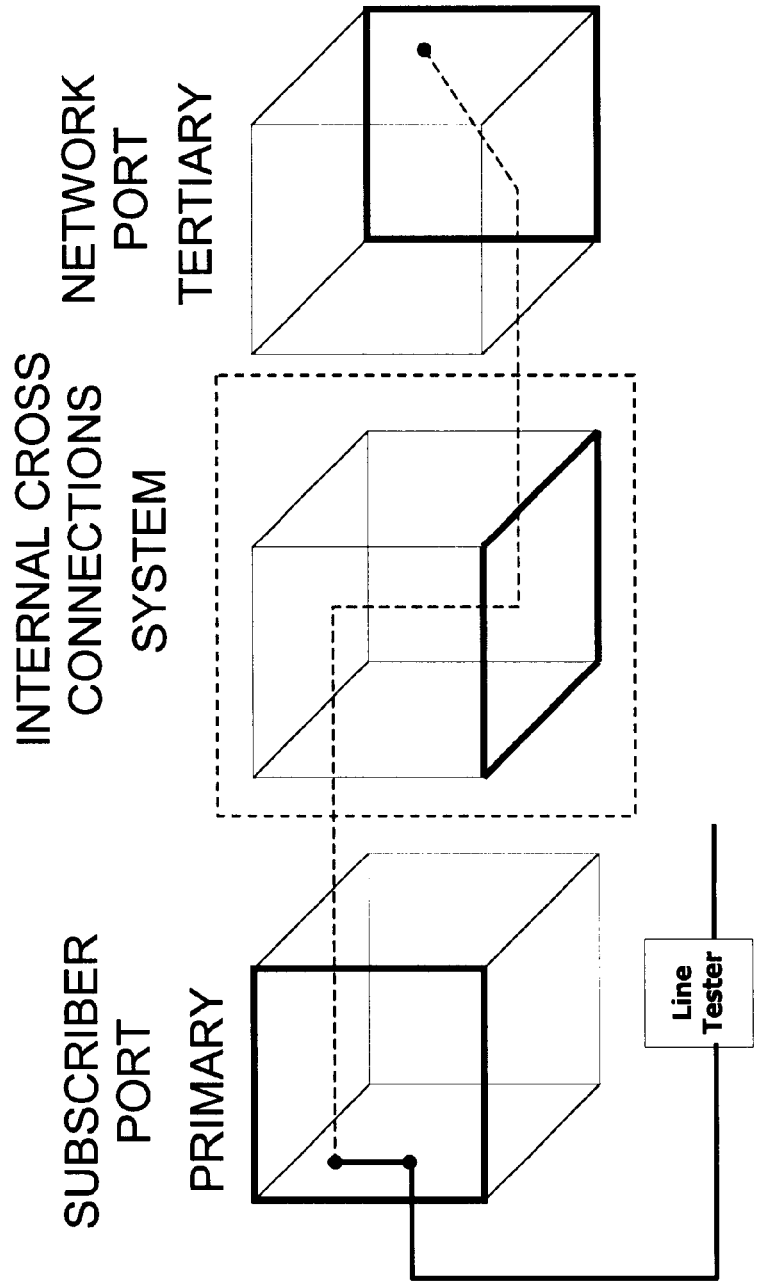
Figure 18:
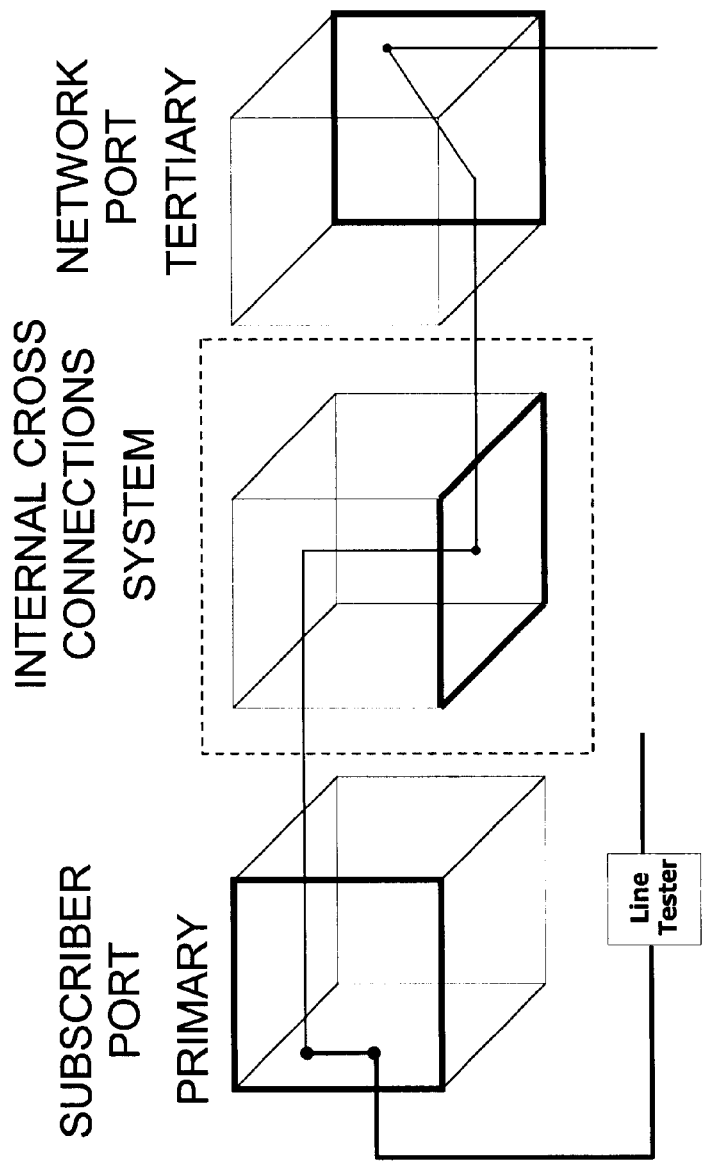

An example of matrix boards in relation to the robotic cross-connector is shown in FIG. 12. As shown, typically two mother boards 1202A and 1202B, upon which matrix boards 1204 are mounted, one robotic cross-connector 1002, and the additional circuitry are grouped to form a cross connect system.

FIGS. 13–18 illustrate some standard 3 dimensional connection paths, which are completed by the ControlPoint Remote cross-connect switch in response to commands.

According to another embodiment of the present invention, the cross-connect switch may be implemented at the central office and/or between the central office and one or more end user locations. For example, referring to FIG. 2, the cross connect switch 210, may be implemented at nodes that are connected to central offices and distribute wiring to subscriber locations, such as at multiple dwelling units, multiple tenant unit, pole mounted facilities or curbside facilities, such as boxes, which service local communities of subscribers.

Conventionally, each remote node includes a manual patch panel for connecting wires that originate from a central office to wires that lead to subscriber locations. In order to make a change in service for a subscriber, typically the service provider or telephone company has had to dispatch a technician to the node. The technician, upon arrival at the CO, multiple dwelling, multiple tenant, curbside box, or pole mount facility, must spend typically from 30 minutes to an hour to a) setup a tent around the box or pole if in harsh weather, b) access the cross-connect in the CO, multiple dwelling, multiple tenant, curbside box or pole mounted facility, c) identify the wire that leads to the subscriber who desires a change in service, c) identify the central office wire for the new service and then, d) make a new connection on the patch panel between the selected central office wire and the customer's wire to establish the new service. This procedure conventionally must be followed for each service changes at a subscriber location. In addition the actual wiring with-in the manual patch panel located in a building, curbside box or pole may at times differ from the documented version of the service database. In such cases, the discrepancies must be corrected prior to completing the above mentioned tasks.

According to an embodiment of the present invention, the manual patch panel may be replaced by a remote controlled cross-connect switch. In order to facilitate installation of the cross-connect switch, the cross-connect switch may be initially pre-connected to match connections with-in the patch panel to be replaced. This may be done automatically by accessing a service database at the central office to obtain the configuration of the patch panel for replacement. This configuration may then be imposed onto the cross-connect switch by commanding the cross-connect switch to reproduce the connections of the patch panel as defined in the service database.

The pre-configured cross-connect switch may then be installed in the remote node. This may be done by wiring the cross-connect in parallel with the existing patch panel to prevent service interruption. Once the connections are verified pursuant to test routines, the patch panel may be disconnected leaving the remote cross-connect to take over. Performing the installation in this manner prevents service outages.

According to an embodiment of the present invention, the cross-connect switch includes an associated remote controller (which may be internal or external to the cross-connect), which receives service change commands. Upon receiving a service change command, the remote controller causes the cross-connect to automatically connect (or disconnect) a subscriber to (or from) a new central office line for providing (or discontinuing) a service. In this manner, changes in service can be made at remote nodes from an automated or semi-automated central locations, without dispatching any technicians to the remote site or to a central office. In addition, the changes can be made in a matter of seconds, rather than hours or days.

The remote controller that controls the cross-connect installed at remote nodes such as in pole mounted nodes may be the same as that described with reference to the Figures. The remote controller may be coupled to the Network management system (NMS) or Network Operations Center (NOC) 212 for receiving commands relating to subscriber changes in any convenient manner. For example, the remote controller may be coupled via a dial up line, via a Leased line, a central office line, a wireless link, a LAN, a WAN (including over the Internet) or by any other convenient link. In addition, the remote controller may communicate with the NOC through any convenient protocol including TL1, CORBA, TCP and SNMP to name a few. Tremendous savings of time, money and manpower are achieved by implementing remote control functionality according to the present invention.

According to an embodiment of the present invention, there may be a cross-connect switch implemented in the central office and another cross-connect switch implemented between the central office and one or more end user locations. For example, a cross connect switch may be implemented in the central office, as shown in FIG. 2, while one or more additional cross connects may be implemented at nodes that are connected to central offices and distribute wiring to subscriber locations, such as at multiple dwelling or multiple tenant facilities, pole mounted facilities or curbside boxes that service local communities of subscribers.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of providing telecommunications service comprising the steps of:

provided telecommunications service for telecommunications equipment of a first subscriber via an automated, physical, metallic, matrix cross-connect switch connected to a telecommunications network, the automated cross-connect switch remotely operable to break and establish physical connections under control by a processor and implemented between a central office and a subscriber location, the telecommunications equipment of the first subscriber physically connected to a first telecommunications service;

receiving, at a network operations center remote from and communicatively connected to the automated cross connect switch, an indication that the first subscriber has terminated or changed service;

in response to receiving, at the network operations center, the indication that the first subscriber has changed service, transmitting a command to the automated cross connect switch to automatically switch the physical connection of the telecommunications equipment of the first subscriber from the first telecommunications service to a second telecommunications service; and in response to receiving the command at the automated cross-connect switch, automatically under control by a processor breaking the physical connection of the telecommunications equipment of the first subscriber with the first telecommunications service and to establish a physical connection of the telecommunications equipment of the first subscriber with the second telecommunications service.

2. The method of claim 1, wherein the cross-connect switch is implemented as a pole mounted facility.

3. The method of claim 1, wherein the cross-connect switch is implemented as a curb-side facility.

4. The method of claim 1, further comprising the step of: replacing a patch panel with the cross-connect switch.

5. The method of claim 4, wherein the step of replacing the patch panel with the cross-connect switch comprises the step of:
pre-connecting the cross-connect switch initially to match connections within the patch panel.

6. The method of claim 5, wherein the step of pre-connecting the cross-connect switch initially to match connections within the patch panel comprises the steps of:
accessing a service database at the central office to obtain a configuration of the patch panel for replacement; and
commanding the cross-connect switch to reproduce the connections of the patch panel as defined in the service database.

7. The method of claim 6, wherein the step of replacing the patch panel with the cross-connect switch further comprises the steps of:
wiring the cross-connect switch in parallel with the patch panel;
verifying the connections using test routines; and
disconnecting the patch panel.

8. The method of claim 1, wherein the telecommunications equipment of the first subscriber is located in a multiple dwelling unit or multiple tenant unit.

9. The method of claim 8, wherein the cross connect switch is connected to a plurality of telecommunications equipment located in the multiple dwelling unit or multiple tenant unit.

10. The method of claim 1, wherein the method further comprises the steps of:
in response to receiving, at the network operations center, an indication that the first subscriber has terminated service, transmitting a command to the cross connect switch to switch out the connection of the telecommunications equipment of first subscriber from the first service; and
in response to receiving the command at the cross-connect switch, switching out the connection of the telecommunications equipment of first subscriber from the first service.

11. The method of claim 10, wherein the telecommunications equipment of the first subscriber is located in a multiple dwelling unit or multiple tenant unit.

12. The method of claim 11, wherein the cross connect switch is connected to a plurality of telecommunications equipment located in the multiple dwelling unit or multiple tenant unit.

13. The method of claim 10, wherein the method further comprises the steps of:
receiving, at the network operations enter, an indication that a second subscriber has initiated service;
in response to receiving the indication at the network operations center, transmitting a command to the cross connect switch to connect data processing equipment of the second subscriber to a new telecommunication service; and
in response to receiving the command at the cross-connect switch, connecting the data processing equipment of second subscriber to the telecommunication service.

14. The method of claim 13, wherein the telecommunications equipment of the first subscriber is located in a multiple dwelling unit or multiple tenant unit.

15. The method of claim 14, wherein the cross connect switch is connected to a plurality of telecommunications equipment located in the multiple dwelling unit or multiple tenant unit.

16. A system for providing telecommunications service comprising:
means for providing telecommunications service for telecommunications equipment of a first subscriber connected to a first telecommunications service the means for providing telecommunications service comprising an automated, physical, metallic, matrix connected to a telecommunications network, the automated cross-connect switch remotely operable to break and establish physical connections under control by a processor, the automated cross-connect switch implemented between a central office and a subscriber location;
means for receiving an indication that the first subscriber has terminated or changed service, the means for receiving remote from and communicatively connected to the means for providing telecommunications service;
means for transmitting a command to the means for providing telecommunications service to automatically switch a physical connection of the telecommunications equipment of the first subscriber from the first telecommunications service to a telecommunications second service, the means operable in response to receiving an indication that the first subscriber has changed service; and
means for automatically under control by a processor breaking the physical connection of the telecommunications equipment of the first subscriber with the first telecommunications service and to establish a physical connection of the telecommunications equipment of the first subscriber with the second telecommunications service, the means operable in response to receiving the command.

17. The system of claim 16, wherein the cross-connect switch is implemented as a pole mounted facility.

18. The system of claim 16, wherein the cross-connect switch is implemented as a curb-side facility.

19. The system of claim 16, wherein the cross-connect switch replaces a patch panel.

20. The system of claim 19, wherein the cross-connect switch is initially pre-connected to match connections within the patch panel.

21. The system of claim 20, wherein the cross-connect switch is initially pre-connected to match connections within the patch panel by accessing a service database at the central office to obtain a configuration of the patch panel for replacement, and commanding the cross-connect switch to reproduce the connections of the patch panel as defined in the service database.

22. The system of claim 21, wherein the cross-connect switch replaces a patch panel by wiring the cross-connect switch in parallel with the patch panel, verifying the connections using test routines, and disconnecting the patch panel.

23. The system of claim 16, wherein the telecommunications equipment of the first subscriber is located in a multiple dwelling unit or multiple tenant unit.

24. The system of claim 23, wherein the cross connect switch is connected to a plurality of telecommunications equipment located in the multiple dwelling unit or multiple tenant unit.

25. The system of claim 16, wherein the system further comprises:
   means for transmitting a command to means for providing telecommunications service to switch out the connection of the telecommunications equipment of first subscriber from the first service, the means operable in response to receiving an indication that the first subscriber has terminated service; and
   means for switching out the connection of the telecommunications equipment of first subscriber from the first service, the means operable in response to receiving the command.

26. The system of claim 25, wherein the telecommunications equipment of the first subscriber is located in a multiple dwelling unit or multiple tenant unit.

27. The system of claim 26, wherein the cross connect switch is connected to a plurality of telecommunications equipment located in the multiple dwelling unit or multiple tenant unit.

28. The system of claim 27, wherein the system further comprises:
   means for receiving an indication that a second subscriber has initiated service;
   means for transmitting a command to the cross connect switch to connect data processing equipment of the second subscriber to a second service, the means operable in response to receiving the indication; and
   means for connecting the data processing equipment of second subscriber to the new telecommunication service, the means operable in response to receiving the command.

29. The system of claim 28, wherein the telecommunications equipment of the first subscriber is located in a multiple dwelling unit or multiple tenant unit.

30. The system of claim 29, wherein the cross connect switch is connected to a plurality of telecommunications equipment located in the multiple dwelling unit or multiple tenant unit.

31. A system for providing telecommunications service comprising:
   an automated, physical, metallic, matrix cross-connect switch connected to a telecommunications network, the automated cross-connect switch remotely operable to break and establish physical connections under control by a processor and to provide telecommunications service for telecommunications equipment of a first subscriber physically connected to a first telecommunications service, the automated cross-connect switch implemented between a central office and a subscriber location; and
   a network operations center remote from and communicatively connected to the automated cross connect switch, operable to receive an indication that the first subscriber has terminated or changed service and operable to, in response to receiving an indication that the first subscriber has changed service, transmit a command to the automated cross connect switch to automatically switch the
   wherein the automated cross-connect switch is further operable to, in response to receiving the command, automatically under control by a processor break the physical the connection of the telecommunications equipment of the first subscriber with the first telecommunications service and to establish a physical connection of the telecommunications equipment of the first subscriber with the second telecommunications service.

32. The system of claim 31, wherein the cross-connect switch is implemented as a pole mounted facility.

33. The system of claim 31, wherein the cross-connect switch is implemented as a curb-side facility.

34. The system of claim 31, wherein the cross-connect switch replaces a patch panel.

35. The system of claim 34, wherein the cross-connect switch is initially pre-connected to match connections within the patch panel.

36. The system of claim 35, wherein the cross-connect switch is initially pre-connected to match connections within the patch panel by accessing a service database at the central office to obtain a configuration of the patch panel for replacement, and commanding the cross-connect switch to reproduce the connections of the patch panel as defined in the service database.

37. The system of claim 36, wherein the cross-connect switch replaces a patch panel by wiring the cross-connect switch in parallel with the patch panel, verifying the connections using test routines, and disconnecting the patch panel.

38. The system of claim 31, wherein the telecommunications equipment of the first subscriber is located in a multiple dwelling unit or multiple tenant unit.

39. The system of claim 38, wherein the cross connect switch is connected to a plurality of telecommunications equipment located in the multiple dwelling unit or multiple tenant unit.

40. The system of claim 31, wherein:
   the network operations center is further operable to, in response to receiving an indication that the first subscriber has terminated service, transmit a command to the cross connect switch to switch out the connection of the telecommunications equipment of first subscriber from the first service; and
   the cross-connect switch is further operable to, in response to receiving the command, switch out the connection of the telecommunications equipment of first subscriber from the first service.

41. The system of claim 40, wherein the telecommunications equipment of the first subscriber is located in a multiple dwelling unit or multiple tenant unit.

42. The system of claim 41, wherein the cross connect switch is connected to a plurality of telecommunications equipment located in the multiple dwelling unit or multiple tenant unit.

43. The system of claim 42, wherein:
   the network operations center is further operable to receive an indication that a second subscriber has initiated service and operable to, in response to receiving the indication, transmit a command to the cross connect switch to connect data processing equipment of the second subscriber to a telecommunication service; and
   the cross-connect switch is further operable to connect the data processing equipment of second subscriber to the telecommunication service, in response to receiving the command.

44. The system of claim 42, wherein the telecommunications equipment of the first subscriber is located in a multiple dwelling unit or multiple tenant unit.

45. The system of claim 44, wherein the cross connect switch is connected to a plurality of telecommunications equipment located in the multiple dwelling unit or multiple tenant unit.

* * * * *

UNITED STATES PATENT AND TRADEMARK OFFICE
CERTIFICATE OF CORRECTION

PATENT NO. : 6,754,329 B2
DATED : June 22, 2004
INVENTOR(S) : Joe Teixeira

It is certified that error appears in the above-identified patent and that said Letters Patent is hereby corrected as shown below:

Title page,
Item [56], References Cited, OTHER PUBLICATIONS, "The Irwin Handbook of telecommunications," reference, change "Patel" to -- Pantel --

Signed and Sealed this

Twenty-fourth Day of August, 2004

JON W. DUDAS
*Director of the United States Patent and Trademark Office*